United States Patent
Jin

(10) Patent No.: US 9,015,579 B2
(45) Date of Patent: *Apr. 21, 2015

(54) APPARATUS AND PROGRAM FOR EFFICIENTLY GENERATING ELECTRONIC ALBUMS USING TEMPLATES SELECTED BASED ON IMAGE EVALUATION VALUES

(75) Inventor: Haomin Jin, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 1524 days.

This patent is subject to a terminal disclaimer.

(21) Appl. No.: 11/892,243

(22) Filed: Aug. 21, 2007

(65) Prior Publication Data

US 2008/0050039 A1 Feb. 28, 2008

(30) Foreign Application Priority Data

Aug. 22, 2006 (JP) ................................ 2006-224987

(51) Int. Cl.
| | |
|---|---|
| G06F 17/00 | (2006.01) |
| H04N 1/00 | (2006.01) |
| G06F 17/24 | (2006.01) |
| G06F 17/30 | (2006.01) |
| G06T 11/60 | (2006.01) |

(52) U.S. Cl.
CPC ....... H04N 1/00196 (2013.01); H04N 1/00132 (2013.01); G06F 17/248 (2013.01); G06F 17/3028 (2013.01); G06T 11/60 (2013.01)

(58) Field of Classification Search
CPC ...................... H04N 1/00132; H04N 1/00196
USPC ................ 715/255, 201; 725/34, 35; 382/284
See application file for complete search history.

(56) References Cited

U.S. PATENT DOCUMENTS

| | | | | |
|---|---|---|---|---|
| 7,369,164 | B2 * | 5/2008 | Parulski et al. | 348/231.99 |
| 7,487,524 | B2 * | 2/2009 | Miyamori | 725/34 |
| 7,835,580 | B2 * | 11/2010 | Ono | 382/224 |
| 2002/0019833 | A1 * | 2/2002 | Hanamoto | 707/500 |
| 2002/0122067 | A1 * | 9/2002 | Geigel et al. | 345/788 |
| 2002/0147637 | A1 * | 10/2002 | Kraft et al. | 705/14 |
| 2002/0167683 | A1 * | 11/2002 | Hanamoto et al. | 358/1.14 |
| 2003/0072486 | A1 * | 4/2003 | Loui et al. | 382/175 |
| 2003/0128877 | A1 * | 7/2003 | Nicponski | 382/224 |
| 2004/0032599 | A1 * | 2/2004 | Atkins et al. | 358/1.9 |

(Continued)

FOREIGN PATENT DOCUMENTS

| | | |
|---|---|---|
| JP | 2003-116094 A | 4/2003 |
| JP | 2005-196481 A | 7/2005 |

*Primary Examiner* — Kavita Padmanabhan
*Assistant Examiner* — Benjamin J Smith
(74) *Attorney, Agent, or Firm* — Birch, Stewart, Kolasch & Birch, LLP

(57) ABSTRACT

Embodiments are provided for generating electronic albums efficiently by selecting templates matching images to be laid out. Evaluation values for one or more evaluation items representing evaluations of images are set for each image. The images are grouped into a plurality of groups according to images having common evaluation values for one or more evaluation items. For each group, one or more templates are selected into which images included in each group are to be inserted, where the one or more templates are selected based on the common evaluation values of the images included in a group. A plurality of laid out images are generated and the images in each group are arranged within image regions of the selected templates based on attribute data of the image regions and the evaluation values of images in the group. An electronic album is generated as a combination of the laid out images.

6 Claims, 11 Drawing Sheets

(56) References Cited

U.S. PATENT DOCUMENTS

| | | | |
|---|---|---|---|
| 2004/0187078 A1* | 9/2004 | Girgensohn | 715/517 |
| 2005/0081147 A1* | 4/2005 | Tanaka et al. | 715/517 |
| 2005/0111737 A1* | 5/2005 | Das et al. | 382/190 |
| 2005/0134900 A1* | 6/2005 | Kuwata | 358/1.15 |
| 2005/0251771 A1* | 11/2005 | Robles | 716/5 |
| 2006/0064635 A1* | 3/2006 | Reid et al. | 715/517 |
| 2006/0078201 A1* | 4/2006 | Kim et al. | 382/181 |
| 2006/0080286 A1* | 4/2006 | Svendsen | 707/3 |
| 2006/0092771 A1* | 5/2006 | Loui et al. | 369/30.01 |
| 2006/0103891 A1* | 5/2006 | Atkins | 358/450 |
| 2006/0150092 A1* | 7/2006 | Atkins | 715/517 |
| 2006/0200758 A1* | 9/2006 | Atkins | 715/517 |
| 2006/0206470 A1* | 9/2006 | McIntyre | 707/3 |
| 2006/0279566 A1* | 12/2006 | Atkins et al. | 345/418 |
| 2007/0019924 A1* | 1/2007 | Teo et al. | 386/4 |
| 2007/0064121 A1* | 3/2007 | Issa et al. | 348/231.2 |
| 2008/0218600 A1* | 9/2008 | Grosso et al. | 348/231.6 |

* cited by examiner

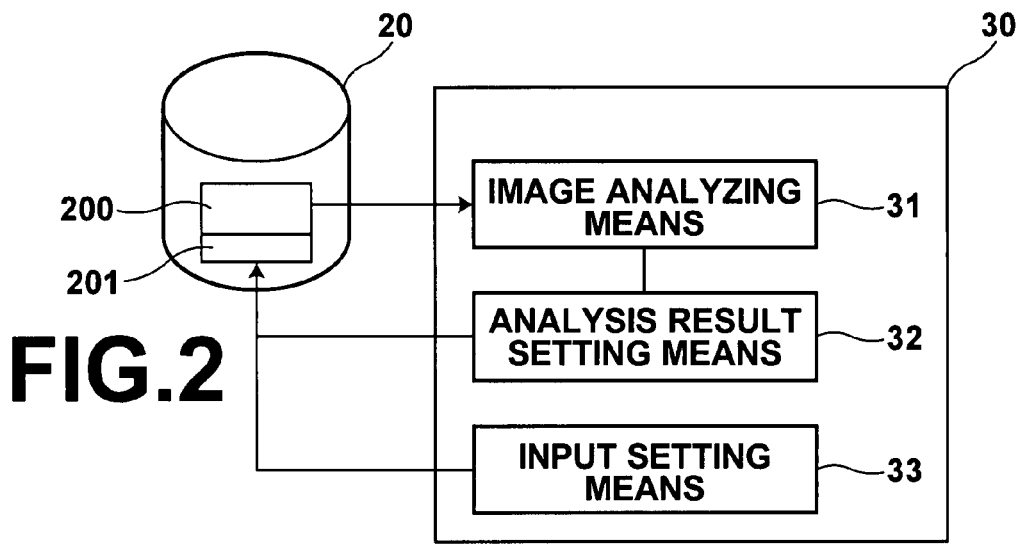
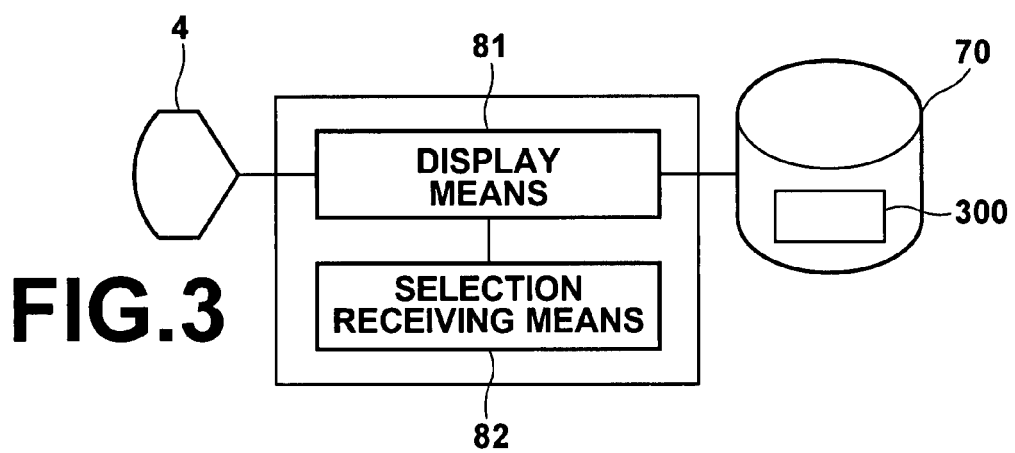
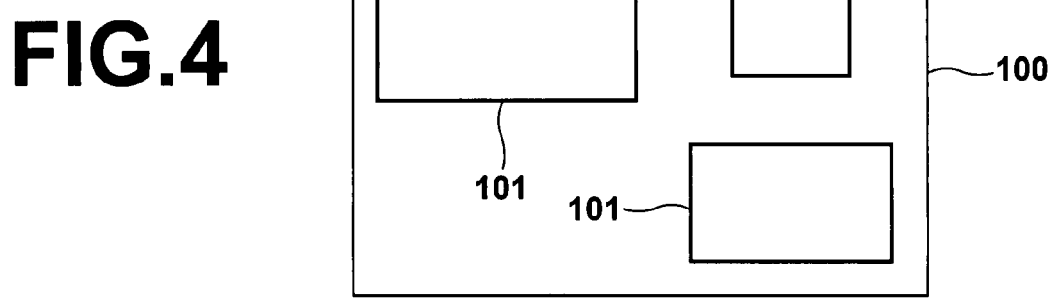

FIG.5

```
<Img_area>
    <name>Main</name>
    <position>x=1000,y=700</position>
    <size>x=200,y=150</size>
    <attribute>
        <description>IMAGE WITH SENSE OF SPREAD</description>
        <description>IMAGE WITH SENSE OF SPREAD + PERSON</description>
        <description>WITHOUT GAZE OF SUBJECT</description>
    </attribute>
</Img_area>
<Img_area>
    <name>Sub1</name>
    <position>x=…,y=…</position>
    <size>x=…,y=…</size>
    <attribute>
        <description>WELL ORGANIZED VERTICAL IMAGE</description>
        <description>WITHOUT GAZE OF SUBJECT</description>
    </attribute>
</Img_area>
<Img_area>
    <name>Sub2</name>
    <position>x=…,y=…</position>
    <size>x=…,y=…</size>
    <attribute>
        <description>COVER PHOTO</description>
        <description>ZOOMED IN</description>
        <description>PORTION OF BODY OR THING</description>
    </attribute>
</Img_area>
```

| A. PHOTOGRAPHY | | B. COLOR/LIGHT | |
|---|---|---|---|
| EVALUATION ITEM | EVALUATION POINT | EVALUATION ITEM | EVALUATION POINT |
| ■ ANGLE | ▲ FROM ABOVE | ■ BRIGHT COLOR | ▲ THE SPACE IS LIT |
| | ▲ FROM OBLIQUELY ABOVE | | ▲ THE SUBJECT IS LIT |
| | ▲ FROM BELOW | | ▲ LIT FROM THE SIDE |
| | ▲ LOW ANGLE | | ▲ PHOTOGRAPHY INTO THE LIGHT |
| ■ FRAMING | ▲ ZOOMED IN | ■ ATTRACTIVE PHOTOGRAPHY | ▲ PATTERN OF SHADOWS |
| | ▲ WELL ORGANIZED VERTICAL POSITIONING | | ▲ CONTRAST BETWEEN LIGHT AND SHADOW |
| | ▲ WELL ORGANIZED HORIZONTAL POSITIONING | ■ COLORED LIGHT | ▲ BLUE LIGHT |
| | ▲ OBLIQUE | | ▲ SUNSET |
| ■ POSITION OF SUBJECT | ▲ FOREGROUND AND BACKGROUND | | ▲ CANDLELIGHT |
| | ▲ FOREGROUND AND BACKGROUND, PERSON AND THING | ■ ATTRACTIVE COLOR | ▲ GREEN IN BACKGROUND |
| | ▲ ARRANGED IN A HORIZONTAL ROW | | ▲ GREEN AND RED IN BACKGROUND |
| | ▲ SURROUNDED | | ▲ FLOWERS IN BACKGROUND |
| ■ SPREAD | ▲ BACKGROUND IS A FIELD | | ▲ BLUE AS A WHOLE |
| ■ DEPTH | ▲ SENSE OF DEPTH IN BACKGROUND | | ▲ COLORED RIVER |
| | ▲ CURVE WITH SENSE OF DEPTH IN BACKGROUND | | ▲ ATTRACTIVE COLOR OF OBJECT |
| ■ IMAGE DIVISION | ▲ DIVIDED BY PEOPLE | | ▲ ATTRACTIVE COLOR OF CLOTHING |
| | ▲ DIVIDED BY COLOR | | ▲ ATTRACTIVE COLOR OF WALLS |
| | ▲ DIVIDED BY LIGHT/DARK | | ▲ COLOR SEPARATION |

FIG.6B

| C. POSE | |
|---|---|
| EVALUATION ITEM | EVALUATION POINT |
| ■ LOOKING OVER ONE'S SHOULDER | ▲ |
| ■ ORIENTATION OF BODY | ▲ FACING AWAY |
| | ▲ FACING SIDEWAYS |
| | ▲ UPSIDE DOWN |
| | ▲ PRONE |
| ■ HANDS EXTENDED | ▲ |
| ■ STATE OF HANDS | ▲ HANDS OPEN |
| | ▲ HANDS RAISED |
| ■ MULTIPLE SUBJECTS | ▲ TWO PEOPLE TOGETHER |
| | ▲ HOLDING HANDS |
| | ▲ FACING EACH OTHER |
| | ▲ ARBITRARY POSES |
| | ▲ WITH AN ANIMAL |
| ■ ACTIVITY | ▲ EXERCISING |
| | ▲ EATING |
| ■ INTERESTING POSE | ▲ PLAYING |
| | ▲ DOING TWO THINGS SIMULTANEOUSLY |
| | ▲ COPYCAT |

| C. POSE | |
|---|---|
| EVALUATION ITEM | EVALUATION POINT |
| ■ WITH OBJECTS | ▲ HATS |
| | ▲ FASHION ACCESSORIES |
| | ▲ STUFFED ANIMALS |
| | ▲ TOYS |
| | ▲ ROUND OBJECTS |
| | ▲ ELONGATE OBJECTS |
| | ▲ POSING WITH OBJECTS |
| | ▲ ATTRACTIVE COLORED CHILDREN'S OBJECT |
| | ▲ VEHICLE |
| | ▲ PLAYGROUND EQUIPMENT |

FIG.6C

| D. EXPRESSION | |
|---|---|
| EVALUATION ITEM | EVALUATION POINT |
| ■ EXPRESSIONS OF EYES AND MOUTH | ▲ GAZING |
| | ▲ MOUTH IS OPEN |
| ■ MAKING FACES | ▲ FUNNY FACE |
| ■ EMOTIVE EXPRESSION | ▲ CRYING |
| | ▲ LAUGHING |
| | ▲ SMILING |

| E. SIGNIFICANCE | |
|---|---|
| EVALUATION ITEM | EVALUATION POINT |
| ■ SPECIAL SCENE | ▲ ANNIVERSARY |
| | ▲ BABY SCENE |
| | ▲ EVENT |
| | ▲ WEATHER |
| | ▲ FOOD |
| ■ COVER PHOTO | ▲ FLOWER/PLANT |
| | ▲ ANIMAL/INSECT |
| | ▲ WORK OF ART |
| | ▲ FASHION ACCESSARY |
| | ▲ TOY/STUFFED ANIMAL |
| | ▲ PORTION OF THE BODY |
| ■ ARTISTIC PHOTO | ▲ SUBJECT IN REFLECTION |
| | ▲ PHOTO SET |
| | ▲ SENSE OF WONDER |
| ■ STORYTELLING PHOTO | ▲ LIKE A SCENE FROM A MOVIE |
| ■ CONTINUOUS PHOTOS | ▲ CONTINUALLY MOVING POSE |
| | ▲ CHANGES IN FRONT OF THE SAME BACKGROUND |

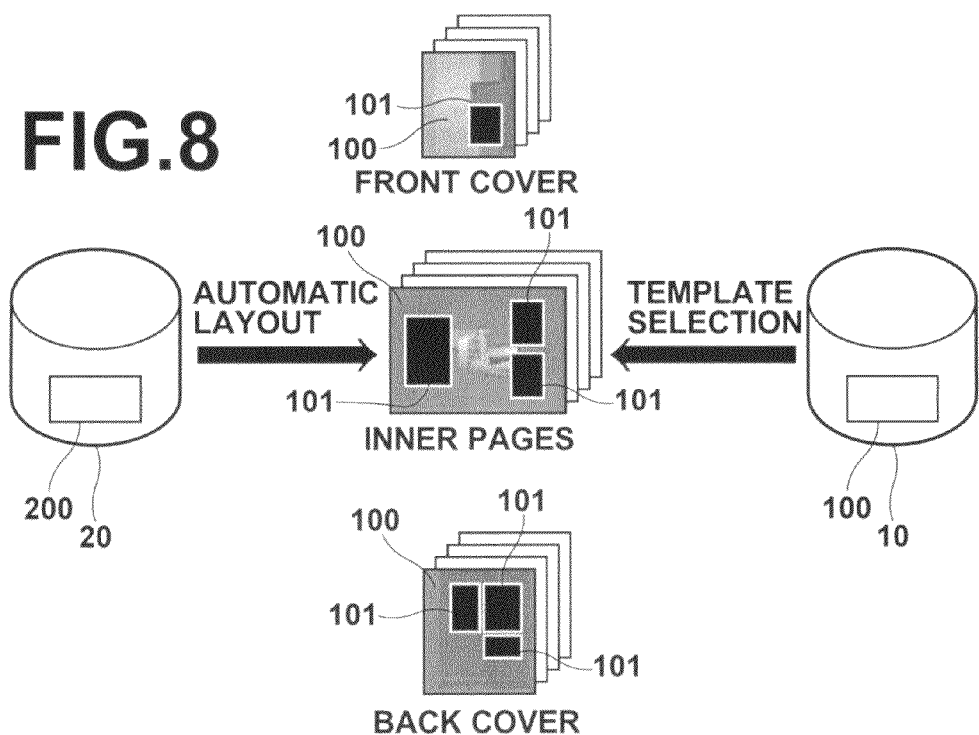
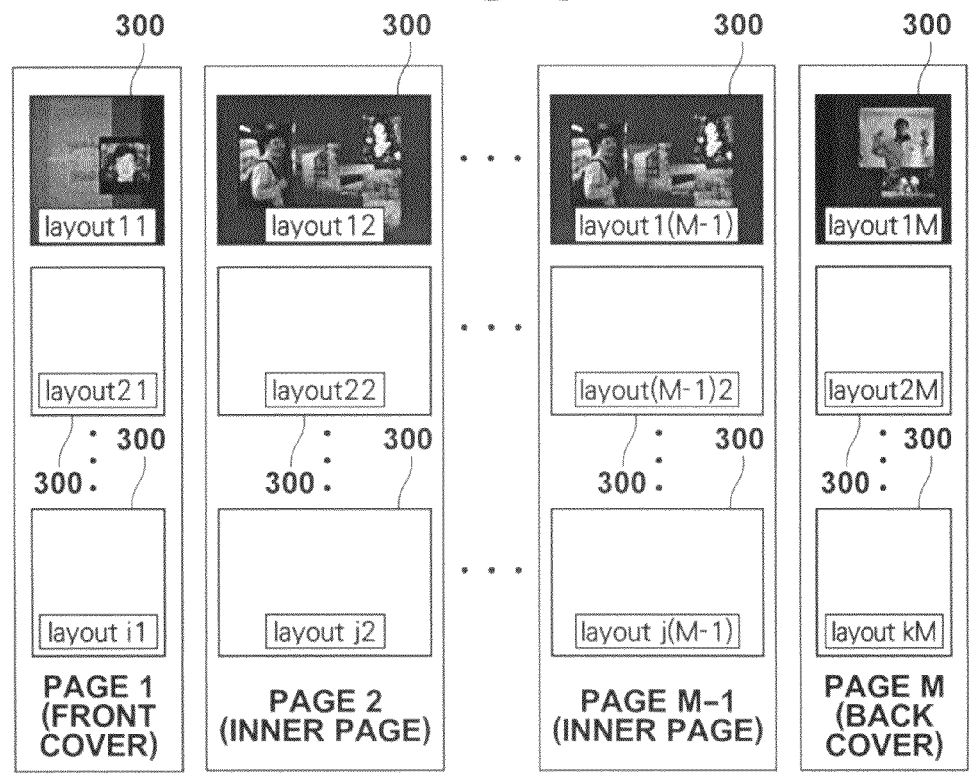

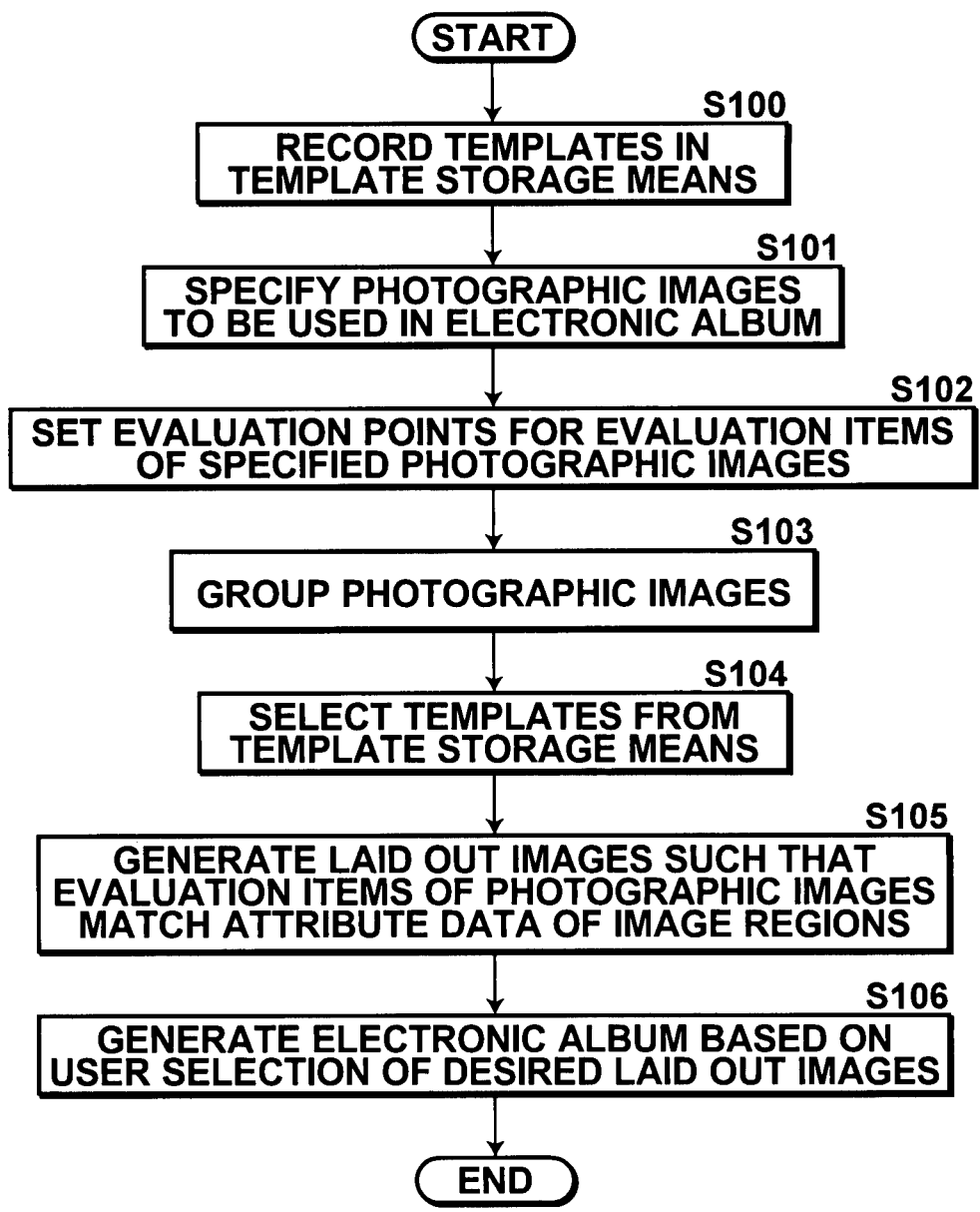

APPARATUS AND PROGRAM FOR EFFICIENTLY GENERATING ELECTRONIC ALBUMS USING TEMPLATES SELECTED BASED ON IMAGE EVALUATION VALUES

BACKGROUND OF THE INVENTION

1. Field of the Invention

The present invention relates to an apparatus and a program for generating electronic albums, by laying out digital photographic images within templates.

2. Description of the Related Art

Methods for automatically laying out images, characters, and the like according to prepared templates have been proposed. However, the layouts of templates affect the clearness and attractiveness of the outcomes of automatic layout. Therefore, designers or the like design several layouts in advance, and images and characters are laid out by use of templates having the layouts. More specifically, templates each having frames to insert images or characters therein are prepared in predetermined layout areas, and images and characters are inserted in the frames according to the templates. Services have been proposed, in which digital images photographed by digital still cameras and the like are laid out in the templates, to generate electronic albums.

Among these electronic albums, there are those which are displayed while music is played to match the images. Conventionally, the music and the images are combined such that an operator instructs the display of images to be switched while the music is played, in order to perform display such that the music and the images match. However, this operation requires experienced operators. Therefore, a method has been proposed in Japanese Unexamined Patent Publication No. 2003-116094, in which data, which is a combination of music and model images which are displayed at specific timings during playback of the music, is generated, and the model images are substituted by users' own images.

There are cases in which speech balloons are inserted into images, to realistically reproduce situations which had occurred during photography. Japanese Unexamined Patent Publication No. 2005-196481 discloses a system that detects subjects pictured within images, and displays speech balloons corresponding to the positions of the subjects.

However, in each of the above methods, it is necessary for users to lay out images that match the templates, while viewing the images, which is troublesome. In addition, there are cases in which the prepared templates do not match the images to be laid out. In order to be able to find templates which are suited for any type of image, it becomes necessary to prepare a great number of templates. However, if the number of templates is increased, the workload involved in finding suitable templates also increases.

SUMMARY OF THE INVENTION

The present invention has been developed in view of the foregoing circumstances. It is an object of the present invention to provide an apparatus and a program capable of generating electronic albums efficiently, by selecting templates that match images to be laid out.

The electronic album generating apparatus of the present invention comprises:

template storage means in which a plurality of templates, each including region data that represent image regions into which images are to be inserted within a layout area and attribute data that represent the attributes of images to be inserted into the image regions, are recorded;

image storage means in which a plurality of photographic images are recorded;

evaluation setting means, for setting evaluation values for one or more evaluation items that represent the evaluation for each of the photographic images;

grouping means, for grouping the photographic images into a plurality of groups, based on the evaluations values for the one or more evaluation items;

template selecting means, for selecting one or more templates, into which photographic images included in each group are to be inserted, based on the evaluation item set for the photographic images included in each group;

laid out image generating means, for generating a plurality of laid out images, in which the photographic images included in each group are arranged within the image regions of the templates that are selected for each group, based on the attribute data of the image regions and the evaluation values for the evaluation items of the photographic images included in the groups; and electronic album generating means, for generating an electronic album, which is a combination of one or more of the laid out images.

The program of the present invention causes a computer to function as:

template storage means in which a plurality of templates, each including region data that represent image regions into which images are to be inserted within a layout area and attribute data that represent the attributes of images to be inserted into the image regions, are recorded;

image storage means in which a plurality of photographic images are recorded;

evaluation setting means, for setting evaluation values for one or more evaluation items that represent the evaluation for each of the photographic images;

grouping means, for grouping the photographic images into a plurality of groups, based on the evaluations values for the one or more evaluation items;

template selecting means, for selecting one or more templates, into which photographic images included in each group are to be inserted, based on the evaluation item set for the photographic images included in each group;

laid out image generating means, for generating a plurality of laid out images, in which the photographic images included in each group are arranged within the image regions of the templates that are selected for each group, based on the attribute data of the image regions and the evaluation values for the evaluation items of the photographic images included in the groups; and electronic album generating means, for generating an electronic album, which is a combination of one or more of the laid out images.

Here, the "layout area" refers to an area in which structural elements, such as images and text, are laid out.

The "templates" refer to frames in which regions for images and text are assigned.

The "attributes of images" refer to features of an image which are unique thereto, and are different from those of other images. For example, the "attributes" may be those that represent the features of the colors within the image, such as luminance, saturation, and brightness. Alternatively, the "attributes" may be photography conditions of the image, subjects which are pictured within the image, or the composition of the image.

A configuration may be adopted, wherein the evaluation value setting means comprises:

image analyzing means, for analyzing the photographic images;

analysis result setting means, for setting the evaluation value for evaluation items of the photographic images that correspond to the results of analysis; and input setting means, for receiving input of evaluation values for evaluation items of the photographic images that do not correspond to the analysis results, and for setting the evaluation values for each evaluation item.

The "evaluation items that do not correspond to the analysis results" refer to items that evaluate data which cannot be obtained by analysis of the photographic images, such as photography scenes and the intentions of photographers.

A configuration may be adopted, wherein:

the electronic album generating means comprises:

display means, for displaying the plurality of laid out images generated by the laid out image generating means on a screen; and selection receiving means, for receiving input that one or more of the laid out images has been selected; and wherein the electronic album is generated by combining the one or more selected laid out images.

According to the present invention, templates which are suited for photographic images are selected, based on the attribute data of the image regions within the templates and the evaluation values of the photographic images to be laid out. A plurality of laid out images, in which the photographic images are automatically laid out within the image regions of the templates, are generated, and an electronic album is generated, by selecting the most attractive laid out images. Thereby, the trouble of selecting templates which are suited for photographic images to be laid out from among a great number of templates, and the trouble of laying out the photographic images within the templates are obviated, and an electronic album can be generated efficiently.

In addition, evaluation items of photographic images may be input automatically by image analysis, and other evaluation items of photographic images may be input manually while viewing the images. Thereby, templates, which are more suited to photography situations and the intentions of photographers, may be selected by employing information which is not obtainable only by analysis of the photographic images.

Further, laid out images may be displayed for users to select. Thereby, electronic albums that suit the preferences of the users may be generated.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

BRIEF DESCRIPTION OF THE DRAWINGS

FIG. 2 is a diagram that illustrates the schematic construction of an evaluation value setting means.

FIG. 3 is a diagram that illustrates the schematic construction of an electronic album generating means of the electronic album generating apparatus according to the first embodiment.

FIG. 4 is a diagram for explaining the image regions of a template.

FIG. 5 is a diagram that illustrates an example of an XML file.

FIG. 6A is a first table that illustrates examples of evaluation items.

FIG. 6B is a second table that illustrates examples of evaluation items.

FIG. 6C is a third table that illustrates examples of evaluation items.

FIG. 8 is a diagram that illustrates selection of templates for each position within an album, and layout of photographic images therein.

FIG. 9 is a diagram that illustrates examples of laid out images that employ templates for each position within an album.

FIG. 10 is a flow chart that illustrates the steps in the process for generating an electronic album utilizing the electronic album generating apparatus of the present invention.

BEST MODE FOR CARRYING OUT THE INVENTION

Figure 1:
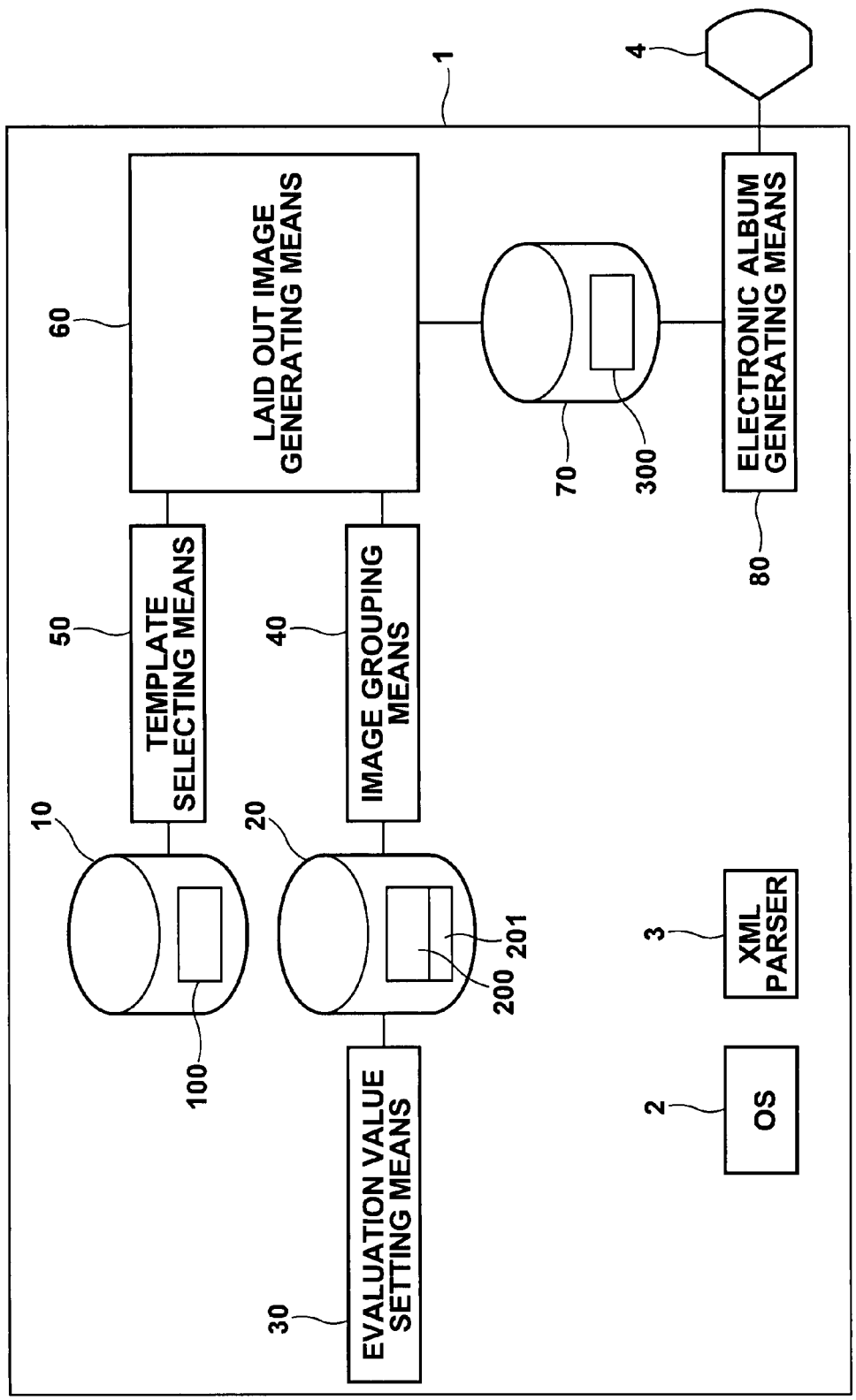
FIG. 1 is a diagram that illustrates the schematic construction of an electronic album generating apparatus according to a first embodiment of the present invention.

Hereinafter, embodiments of the present invention will be described with reference to the attached drawings. An electronic album generating apparatus 1 according to a first embodiment of the present invention is realized by a computer (a personal computer, for example) executing an application program, which is read into an auxiliary memory device. Basic programs, such as an OS 2 (Operating System) and an XML parser 3 are installed in the computer in advance, and the application software for generating electronic albums is executed while these basic programs are running. The application program for generating electronic albums is distributed by being recorded on recording media, such as CD-ROM's, and the application program is installed in the computer from such a recording medium. Alternatively, the program may be distributed via a network such as the Internet, and installed in the computer via the network.

The electronic album generating apparatus 1 comprises: a template storage means 10, for storing a plurality of templates 100 therein; an image storage means 20, for storing a plurality of photographic images 200 to be laid out in the templates 100 therein; an evaluation value setting means 30, for setting evaluation values for a plurality of evaluation items 201 that represent the evaluations of each of the photographic images 200; an image grouping means 40, for grouping the photographic images 200 into a plurality of groups, based on the evaluation values of the evaluation items 201; a template selecting means 50, for selecting templates 100 into which the photographic images 200 included in each group are to be laid out, based on the evaluation items 201 which are set for the photographic images 200 in each group; a laid out image generating means 60, for laying out the photographic images 200 in the templates 100 selected for each of the groups, based on attribute data of image regions within the templates 100 and the evaluation values of the evaluation items of the photographic images 200 to generate laid out images 300; a laid out image storage means 70, for storing the laid out images 300 generated by the laid out image generating means 60; and an electronic album generating means 80, for generating combinations of one or more of the laid out images 300 which are displayed on a display device 4 and selected by a user, as electronic albums.

As illustrated in FIG. 2, the evaluation value setting means 30 comprises: an image analyzing means 31, for analyzing the photographic images 200; an analysis result setting means 32, for setting evaluation values to evaluation items 201 that correspond to the results of image analysis of the photographic images 200; and an input value setting means 33, for receiving input corresponding to evaluation values for evaluation items 201 that do not correspond to the results of image analysis, and for setting evaluation values to these evaluation items 201.

As illustrated in FIG. 3, the electronic album generating means 80 comprises: a display means 81, for displaying the one or more laid out images 300 generated by the laid out image generating means 60 onto a screen; and a selection receiving means 82, for receiving input of selection of one or more of the laid out images 300 displayed by the display means 81.

Specific examples of the template storage means 10 are: high capacity memory devices, such as hard disks provided in the computer; file servers connected to the computer via a network; or servers of internet service providers.

As illustrated in FIG. 4, a template 100 is that in which image regions 101 for laying out images are defined in a layout area. The templates 100 include region data, in which the size and range of the image regions 101 are defined, and attribute data that represent the characteristics of images to be laid out within each of the image regions 101. Specifically, as illustrated in FIG. 5, region data 102 that represent the positions and sizes (or the ranges) of the image regions 101, and attribute data 103 that represent the characteristics of image to be laid out in each image region 101 are described as XML files according to the XML protocol. The XML files that represent region data 102 and the attribute data 103 are recorded in the template storage means 10. In the first embodiment, a case will be described in which the templates 100 are described and recorded as XML files.

The templates 100, which are described according to layouts designed by designers, are prepared in advance. It is desirable for a great number of templates 100 to be recorded in the template storage means 10, in order to enable accommodation of images of various photographed scenes.

Specific examples of the image storage means 200 are: high capacity memory devices, such as hard disks provided in the computer; file servers connected to the computer via a network; or servers of providers that provide photobank services (such as Photobank). The photographic images 200 and evaluation items 201 corresponding to each photographic image 200 are recorded in the image storage means 20.

The photographic images are digital images which are obtained by photography using digital still cameras or the like, digital images obtained by reading out photographic prints or negatives with scanners, and the like.

The evaluation items 201 are divided into categories, such as "Photography", "Color/Light", "Poses", "Expressions", and "Significance". Each category is subdivided into fine items. Specific evaluation items included in the category "Photography" include angle, framing, position of subject, spread, and depth. Specific evaluation items included in the category "Color/Light" include bright light, attractive color, and colored light. Specific evaluation items included in the category "Poses" include looking over one's shoulder, orientation of the body, sitting pose, position of hands, multiple subjects, and moving poses. Specific evaluation items included in the category "Expressions" include expressions of eyes, expressions of mouths, faces, and emotion. Specific evaluation items included in the category "Significance" include cover photo, art photo, story photo, continuous photo, and special scene. FIGS. 6A through 6C illustrate the evaluation values (hereinafter, referred to as "evaluation points") of each evaluation item 201. For example, items related to "Color/Light" are luminance, saturation, and brightness, which are numerical values obtained by image analysis. However, expressions which are easy for humans to understand can be realized, by using words that express the meanings of the numerical values instead of the numerical values.

The evaluation value setting means 30 sets the evaluation values for the evaluation items 201 of the photographic images 200, according to the results of image analysis by the image analyzing means 31 and according to data input by users via the input setting means 33.

The image analyzing means 31 analyzes the photographic images 200 to analyze the colors thereof from histograms of hue, saturation, and brightness. The image analyzing means 31 may also employ a face detector (refer to Japanese Unexamined Patent Publication Nos. 2005-250771 and 2005-250772) to detect faces, to analyze the positions of faces, the sizes of faces, facing directions, and the number of faces. Further, the image analyzing means 31 may analyze image composition, by employing edge detection and Hough transform to extract line data from the photographic images 200.

The analysis result setting means 32 automatically sets evaluation points for the evaluation items 201 that correspond to the results of analysis by the image analyzing means 31. For example, evaluation points for evaluation items 201 related to subjects (refer to "A. Photography" of FIG. 6A) may be set, according to the position, facing direction, and facial expressions obtained by face detection. In addition, evaluation points for evaluation items 201 related to the spread, depth, and image division (refer to "A. Photography" of FIG. 6A) may be set according to the results of compositional analysis of the image. Further, evaluation points for evaluation items 201 related to colors, such as attractive colors, red, yellow, and green, may be set, according to the results of histogram distribution analysis of the image.

The input setting means 33 receives input from users to set evaluation points for evaluation items 201, for which evaluation points cannot be obtained automatically by the aforementioned image analysis. Specifically, an interface, such as that in which the evaluation items 201 which are selectable to receive input are displayed on a screen of the display device 4, is provided, in order to enable input by users. For example, evaluation points for evaluation items falling under the category "Significance" (refer to "E. Significance" of FIG. 6C) are input by users while users view the photographic images, which are displayed by the display device 4.

The image grouping means 40 groups the photographic images 200, based on the evaluation items 201 set by the evaluation value setting means 30. For example, he photographic images 200 are selected and grouped for each of the evaluation categories of "Photography", "Color/Light", "Pose", "Expression", and "Significance". Specifically, the photographic images 20 are automatically grouped according to the evaluation points of the evaluation items 201 as illustrated in FIGS. 6A, 6B, and 6C. It is possible for a single photographic image 200 to belong to a plurality of groups.

Figure 7:
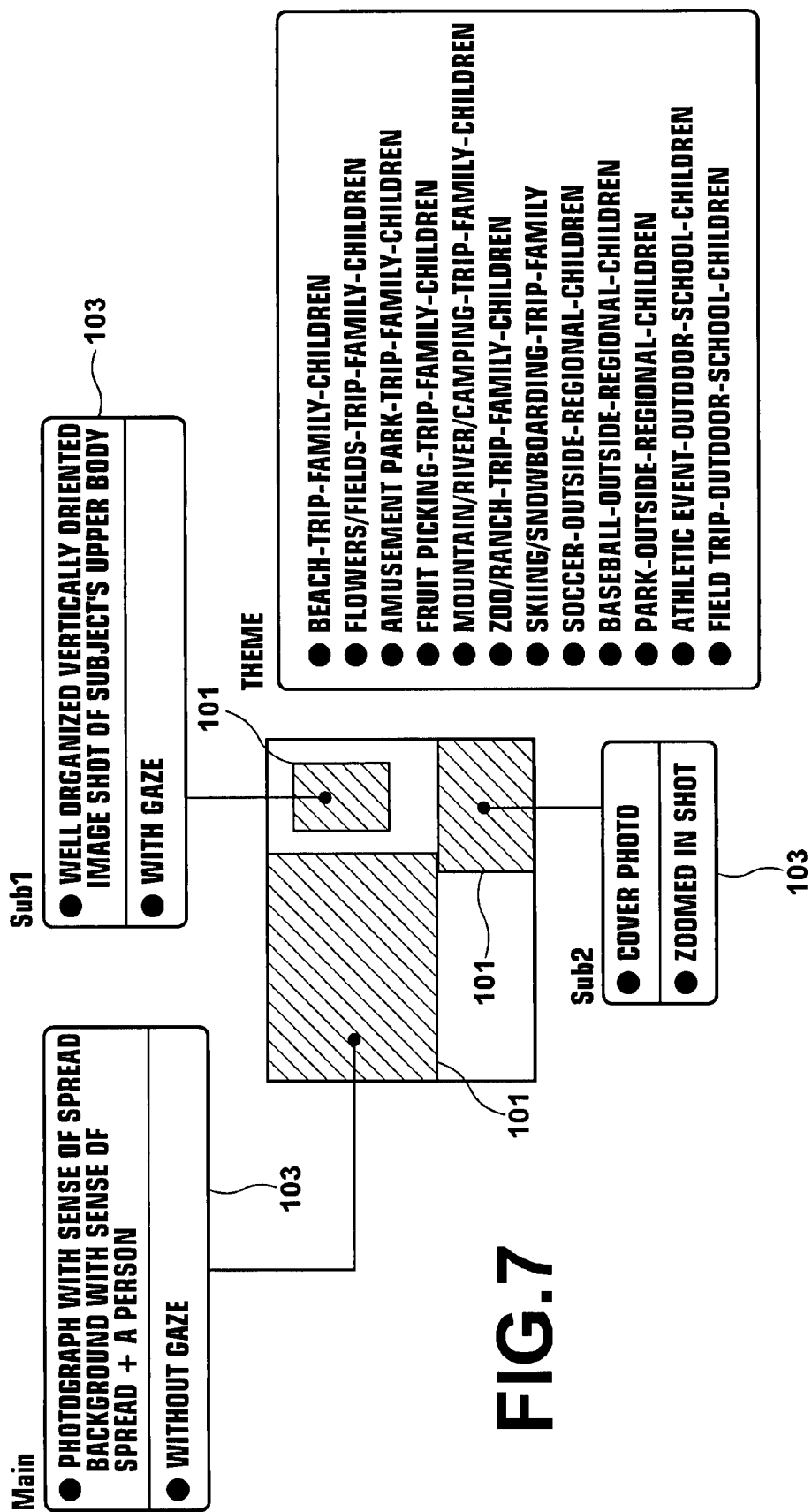
FIG. 7 is a diagram that illustrates the relationships between image regions of a template and attribute data thereof.

Here, the layout of the templates 100 will be described in detail. When the templates 100 are designed, the themes of the templates 100, the sizes, positions and shapes of each image region 101, and the attribute data 103 for each image region 101 are input, as illustrated in FIG. 7. The sizes, positions, and shapes of the image regions 101 which are set in the layout area of a template 100 are written into an XML file. The attribute data 103 of each image region 101, which are the characteristics of images to be laid out therein, is selected from the descriptions corresponding to the evaluation points of the evaluation items 201. The theme of the template 100 corresponds to the evaluation point of the evaluation item "Special Scene".

It is desirable for the layout of the templates 100 to be designed such that photographic images 200 are laid out therein while balancing a sense of organization and a sense of contrast. For example, a sense of organization and a sense of contrast are balanced in a layout in which the sizes of the image regions 101 are set such that a main frame is large, and sub frames are small. In the case that the attribute data 103 describes similar histograms for a main image (a photographic image to be laid out in the main frame) and sub images (photographic images to be laid out in the sub frames), there is a possibility that a sense of organization will be obtained, but a sense of contrast will not. Therefore, by describing histogram distributions which differ from those of a main image in the attribute data 103 of a portion of the sub frames, the layout may become that which balances a sense of organization and a sense of contrast.

Alternatively, the attribute data 103 of the image region 101 of the main frame may be written as "image with sense of spread" and "image without gaze of subject", and the attribute data 103 of the two sub frames may be written as "well organized vertically oriented image" combined with "image with subject's gaze", and "cover photo" combined with "zoomed in shot", respectively, as illustrated in FIG. 7. Thereby, a sense of organization and a sense of contrast can be obtained in the template 100.

In addition, templates 100 which are suited for front covers, back covers, and inner pages are prepared, as illustrated in FIG. 8.

The template selecting means 50 selects one or more templates 100 suited for laying out the photographic images 200 which have been grouped by the image grouping means 40, from among the templates 100 recorded in the template storage means 10 (refer to FIG. 8). The template selecting means 50 may select a plurality of different templates 100 having different layouts for photographic images 200 within a single group. Alternatively, the template selecting means 50 may select a plurality of templates 100 in order to lay out all of the photographic images 200 within a group, in the case that the number of photographic images 200 included in the group is great.

It is preferable for the selected templates 100 to include those suited for different purposes, such as a template suited for a front cover, a template suited for a back cover, and templates suited for inner pages. In addition, the number of templates 100 selected as those to be used as a front cover and a back cover need not be limited to one each, and a plurality of templates 100 may be selected for each of the front cover and the back cover.

The laid out image generating means 60 automatically lays out photographic images 200 in the image regions 101 of the templates 100 which have been selected with respect to each group (refer to FIG. 8). Photographic images 200 are laid out in the templates 100 such that the descriptions of the evaluation points thereof match the attribute data 103 of the image regions 101. For example, in the case that photographic images 200 have "spread", "well organized vertically oriented image", or "cover photo" written as the evaluation points of the evaluation items 201 thereof, they are laid out in image regions having the same attribute data 103. That is, the photographic images 200 are automatically laid out in the templates 100 for each purpose (such as front cover, back cover, and inner pages) such that the evaluation points of the evaluation items 201 and the attribute data 103 of the image regions 101 match. Further, a plurality of laid out images 300, in which the arrangement of the photographic images 200 differ within a single template 100, may be generated, in the case that there are a plurality of photographic images 200, of which the evaluation points match the attribute data 103, within a single group.

The template selecting means 50 selects templates 100 for each group of photographic images 200, if the attribute data 103 of the image regions 101 thereof are described in a portion of the evaluation items 201 of the photographic images 200. In the case that there are no appropriate templates 100, a new template 100 may be defined, and the photographic images 200 may be laid out in the new template 100.

The electronic album generating means 80 generates electronic albums, by selecting one or more of the laid out images 300 generated by the laid out image generating means 60. The laid out images 300 include those in which the photographic images 200 are laid out in templates 100 for front covers, templates 100 for back covers, and templates 100 for inner pages. Therefore, laid out images 300 for each of the positions in the electronic album are generated, as illustrated in FIG. 9. It is preferable for the electronic albums to be those in which the order of the templates 100 is predetermined, such that the flow of the laid out photographic images 200 becomes smooth when viewing the photographic images 200 while flipping through completed electronic albums. FIG. 9 illustrates examples of electronic albums, in which a plurality of templates 100 for inner pages are arranged between templates 100 for front covers and back covers, and in which the order that the templates 100 for the inner pages (from page 2 to page M-1) are arranged is determined.

Laid out images 300 for the front cover and the back cover are selected from those that employ the templates 100 for the front cover and the back cover, respectively. Ordered sequences of laid out images 300 for the inner pages are selected, and electronic albums comprising the selected laid out images 300 are generated. Because a plurality of laid out images are generated for the front cover, the back cover, and the inner pages, respectively, the laid out images 300 are displayed, and electronic albums are generated by users selecting laid out images 300 from among the displayed laid out images 300.

The display means 81 displays the laid out images 300 on the screen of the display device 4, separated into laid out images 300 for front covers, laid out images 300 for inner pages, and laid out images 300 for back covers, for example.

The selection receiving means 82 receives input of selection of the laid out images 300 selected by users, after the users have viewed the laid out images 300 displayed by the display means 81.

Hereinafter, the steps of the process by which an electronic album is generated by the electronic album generating apparatus will be described with reference to the flow chart of FIG. 10.

First, basic templates 100 which are designed based on combinations of evaluation items of photographic images are recorded in the template storage means 10 (step S100).

A user specifies photographic images 200 to be utilized in an electronic album, from among photographic images 200 recorded in the image storage means 20 (step S101). Evaluation points for evaluation items 201 of the photographic images 200 to be utilized in the electronic album are set (step S102). The image analyzing means 31 of the evaluation value setting means 30 analyzes the photographic images, and the analysis result setting means 32 sets evaluation points to the evaluation items corresponding to the results of analysis. The input setting means 33 causes evaluation items 201, for which evaluation points cannot be obtained by image analysis, to be displayed on the screen of the display device 4, and receives input of the evaluation points from the user. The evaluation points of the evaluation items 201 for all of the photographic images 200 are set in this manner.

The image grouping means 40 groups the photographic images 200, based on the evaluation items 201 set by the evaluation value setting means 30 (step S103). Specifically, for example, photographic images 200 having the same evaluation points regarding the evaluation item 201 for "Significance" are grouped together. The template selecting means 50 selects templates 100 suited for laying out the photographic images 200 included in the group, from among the templates 100 recorded in the template storage means 10 (step S104). For example, if the "special scene" evaluation item 201 within the category "Significance" is set to "beach" for photographic images 200 within the group, templates 100 having "beach" scenes as attribute data 103 of the image regions 101 are selected. One or more templates 100, which are suited for laying out the photographic images 200 included in a group, may be selected for each group. The templates 100 are selected so as to include a template for a front cover, a template for a back cover, and templates for inner pages.

The laid out image generating means 60 automatically lays out photographic images 200 in the templates 100 such that the descriptions of the evaluation points of the evaluation items 201 match the descriptions of the attribute data 103 of the image regions 101 (step S105). In the case that the evaluation points of a plurality of photographic images 200 match the description of attribute data 103 for a single image region 101, a plurality of laid out images, in which the plurality of photographic images 200 are laid out in a single template, are generated. FIG. 9 illustrates an example in which i laid out images 300 in which photographic images 200 are laid out in templates 100 for front covers (layout 11, layout 12, . . . , layout 1i), j laid out images 300 in which photographic images 200 are laid out in templates 100 for a second inner page (layout 12, layout 22, . . . layout j2 . . . ) through a second to last inner page (layout 1 (M-1), layout 2 (M-1), . . . layout j (M-1)), and k laid out images 300 in which photographic images 200 are laid out in templates 100 for back covers (layout 1M, layout 2M, . . . layout kM) are generated.

The display means 81 of the electronic album generating means 80 displays the laid out images on the screen of the display device 4. The user selects favorable laid out images 300 from among the displayed laid out images 300, which are the photographic images 200 laid out in templates 100 for each position in the album. The selection receiving means 82 receives input of the user's selections, and the electronic album is generated as a combination of the selected laid out images 300 (step S106). Specifically, a laid out image 300 for a front cover is selected from among layout 11, layout 12, . . . and layout 1i, laid out images 300 for inner pages are selected from among layout 12, layout 22, . . . layout j2 . . . through layout 1 (M-1), layout 2 (M-1) . . . layout j (M-1), and a laid out image 300 for a back cover is selected from among layout 1M, layout 2M . . . and layout kM.

As described in detail above, a great number of templates are prepared in advance, templates which are suited for photographic images are selected, and laid out images, in which the photographic images are automatically laid out within the image regions of the templates according to the attribute data of the image regions within the templates and the evaluation items of the photographic images. Thereby, electronic albums suited for the scenes photographed in photographic images can be generated easily.

Next, a second embodiment of the present invention will be described. In the first embodiment, laid out images were automatically generated, and users selected laid out images to be utilized in electronic albums one by one. In the second embodiment, a plurality of candidate electronic albums are generated, and users select electronic albums from among the candidate electronic albums. In the following description, components which are the same as those of the first embodiment will be denoted with the same reference numerals, detailed descriptions thereof will be omitted, and only components which are different will be described.

Figure 11:
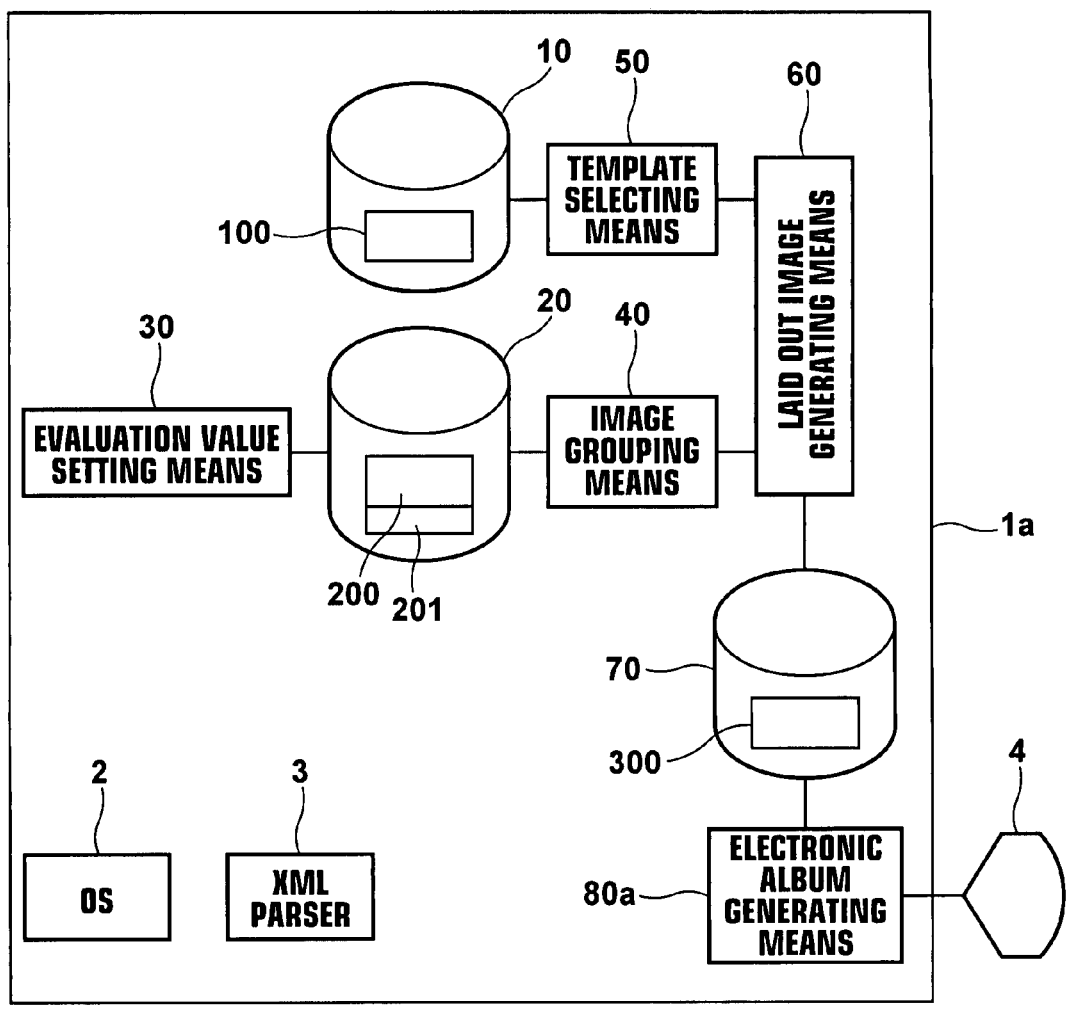
FIG. 11 is a diagram that illustrates the schematic construction of an electronic album generating apparatus according to a second embodiment of the present invention.

As illustrated in FIG. 11, an electronic album generating apparatus 1a according to the second embodiment comprises: the template storage means 10; the image storage means 20; the evaluation value setting means 30; the image grouping means 40; the template selecting means 50; the laid out image generating means 60; the laid out image storage means 70; and an electronic album generating means 80a, for generating a plurality of candidate electronic albums by combining the laid out images 300, and for receiving selections of electronic albums from among the candidate electronic albums.

Figure 12:
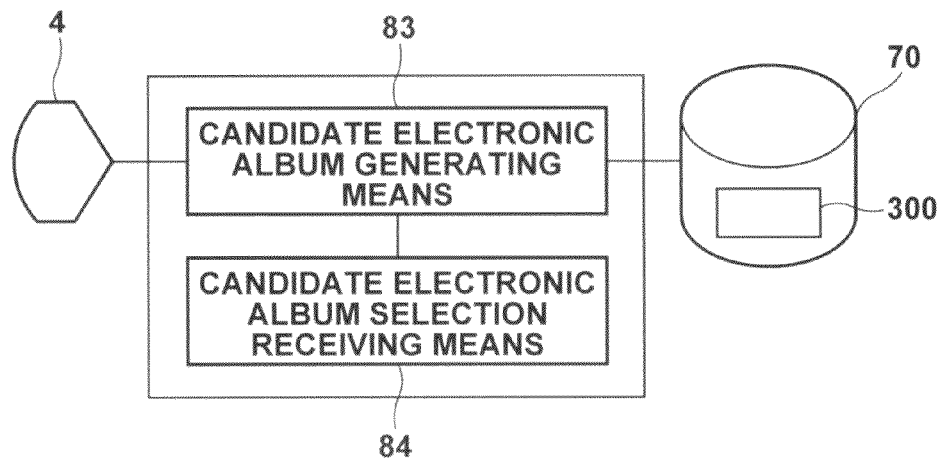
FIG. 12 is a diagram that illustrates the schematic construction of an electronic album generating means of the electronic album generating apparatus according to the second embodiment.

As illustrated in FIG. 12, the electronic album generating means 80a comprises: a candidate electronic album generating means 83, for generating candidate electronic albums by combining pluralities of laid out images 300; and a candidate album selection receiving means 84.

Figure 13:
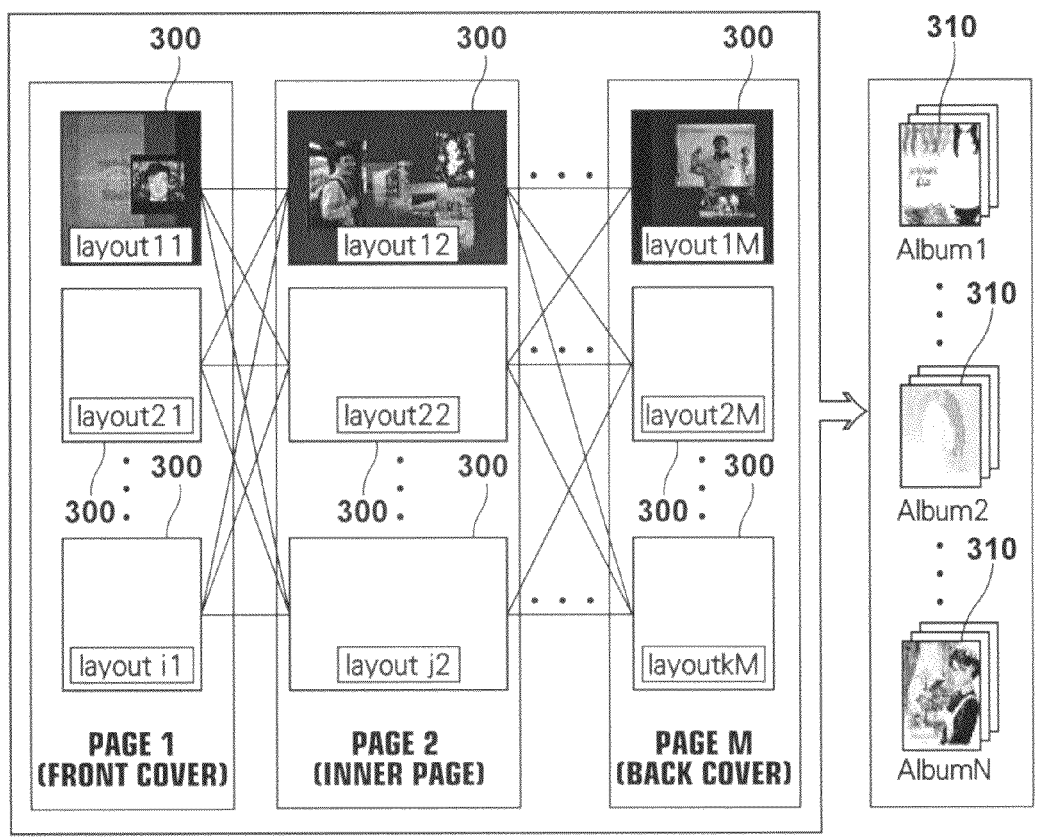
FIG. 13 is a diagram that illustrates the relationships between laid out images that utilize templates for each position within an album, and candidate electronic albums.

The candidate electronic album generating means 83 selects a necessary number of laid out images 300, which are generated using templates 100 for each position within an album, and generates a plurality of candidate electronic albums 310 by combining the laid out images 300, as illustrated in FIG. 13.

The candidate album selection receiving means 84 displays the plurality of candidate electronic albums 310 on the screen of the display device 4, and receives input of selection of candidate electronic albums 310 by users.

In this manner, a configuration may be adopted, wherein the candidate electronic album generating means 83 generates a plurality of candidate electronic albums 310, and users select favorable electronic albums from among the plurality of generated candidate electronic albums.

In the embodiments described above, the templates were created using the XML protocol. However, the present invention is not limited to this configuration, and any protocol may be employed, as long as it is capable of recording templates such that layouts can be displayed, and images can be arranged therein.

What is claimed is:

1. An electronic album generating apparatus, comprising:
a template storage device in which a plurality of templates, each including region data that represent image regions into which images are to be inserted within a layout area and attribute data that represent the attributes of images to be inserted into the image regions, are recorded;
an image storage device in which a plurality of photographic images are recorded; and
a processor executing instructions so as to function as:
an evaluation setter, for setting evaluation values for one or more evaluation items that represent the evaluation for each image contents of the photographic images;
a grouper, that groups the photographic images into a plurality of groups according to photographic images having common evaluation values for the one or more evaluation items, where each of said plurality of groups comprises a plurality of images;
a template selector that selects for each group one or more templates into the image regions of which photographic images included in each group having evaluation values for evaluation items that match the attribute data of the image regions are to be inserted, wherein the one or more templates are selected for each group to correspond to the common evaluation values of the photographic images included in each group;
a laid out image generator that generates a plurality of laid out images, in which the photographic images included in each group are arranged within the image regions of the one or more templates that are selected for each group, based on the evaluation values for the evaluation items of the photographic images included in the groups, wherein the photographic images having the evaluation values for the evaluation items that match the attribute data of the image region are laid out therein; and
an electronic album generator that generates an electronic album, which is a combination of one or more of the laid out images,
a layout and the attribute data of image regions of each of the plurality of templates correspond to combinations of evaluation items,
each of the plurality of templates includes image regions having different attribute data;
wherein the different attribute data represent difference histogram distributions, and
wherein each of the plurality of templates have a main image area and one or more sub image areas whose sizes are smaller than the size of the main image area,
the one or more sub image areas have the attribute data which represent histogram distributions which differ from those of the main image area.

2. An electronic album generating apparatus as defined in claim 1, wherein the evaluation value setter comprises:
image analyzer that analyzes the photographic images using one or more of color analysis, face detection and analysis of image composition by extracting line segment data;
analysis result setter that sets the evaluation value for evaluation items of the photographic images that correspond to the results of analysis; and
input setter that receives input of evaluation values for evaluation items of the photographic images that do not correspond to the analysis results, and for setting the evaluation values for each evaluation item.

3. An electronic album generating apparatus as defined in claim 1, wherein:
the electronic album generator comprises:
display that displays the plurality of laid out images generated by the laid out image generator on a screen; and
selection receiver that receives input that one or more of the laid out images has been selected; and wherein
the electronic album is generated by combining the one or more selected laid out images.

4. An electronic album generating apparatus as defined in claim 2, wherein:
the electronic album generator comprises:
display that displays the plurality of laid out images generated by the laid out image generator on a screen; and
selection receiver that receives input that one or more of the laid out images has been selected; and wherein
the electronic album is generated by combining the one or more selected laid out images.

5. An electronic album generating apparatus as defined in claim 1, wherein
the evaluation items relate to a photography condition when the photographic image is taken, light and/or color of the photographic image, pose or expression of a person who is in the photographic image, or significance of the photographic image.

6. A non-transitory computer readable medium, having recorded therein a program that causes a computer to function as:
template storage in which a plurality of templates, each including region data that represent image regions into which images are to be inserted within a layout area and attribute data that represent the attributes of images to be inserted into the image regions, are recorded;
image storage in which a plurality of photographic images are recorded;
evaluation setter that evaluation values for one or more evaluation items that represent the evaluation for each image contents of the photographic images;
grouper, that groups the photographic images into a plurality of groups according to photographic images having common evaluations values for the one or more evaluation items, where each of said plurality of groups comprises a plurality of images;
template selector, that selects for each group one or more templates into the image regions of which photographic images included in each group having evaluation values for evaluation items that match the attribute data of image regions are to be inserted, wherein the one or more templates are selected for each group to correspond to the common evaluation values of the photographic images included in each group;
laid out image generator, that generates a plurality of laid out images, in which the photographic images included in each group are arranged within the image regions of the one or more templates that are selected for each group, based on the evaluation values for the evaluation items of the photographic images included in the groups, wherein the photographic images having the evaluation values for the evaluation items that match the attribute data of the image region are laid out therein; and
electronic album generator, that generates an electronic album, which is a combination of one or more of the laid out images,
a layout and the attribute data of image regions of each of the plurality of templates correspond to combinations of evaluation items,
each of the plurality of templates includes image regions having different attribute data;

wherein the different attribute data represent difference histogram distributions, and wherein each of the plurality of templates have a main image area and one or more sub image areas whose sizes are smaller than the size of the main image area, the one or more sub image areas have the attribute data which represent histogram distributions which differ from those of the main image area.

\* \* \* \* \*